Oct. 16, 1962     A. E. ZIERICK     3,058,557
HYDRAULIC CLUTCH AND TURBINE DRIVE

Filed Jan. 27, 1959     2 Sheets-Sheet 1

INVENTOR
Ambrose E. Zierick

Oct. 16, 1962  A. E. ZIERICK  3,058,557
HYDRAULIC CLUTCH AND TURBINE DRIVE
Filed Jan. 27, 1959  2 Sheets-Sheet 2
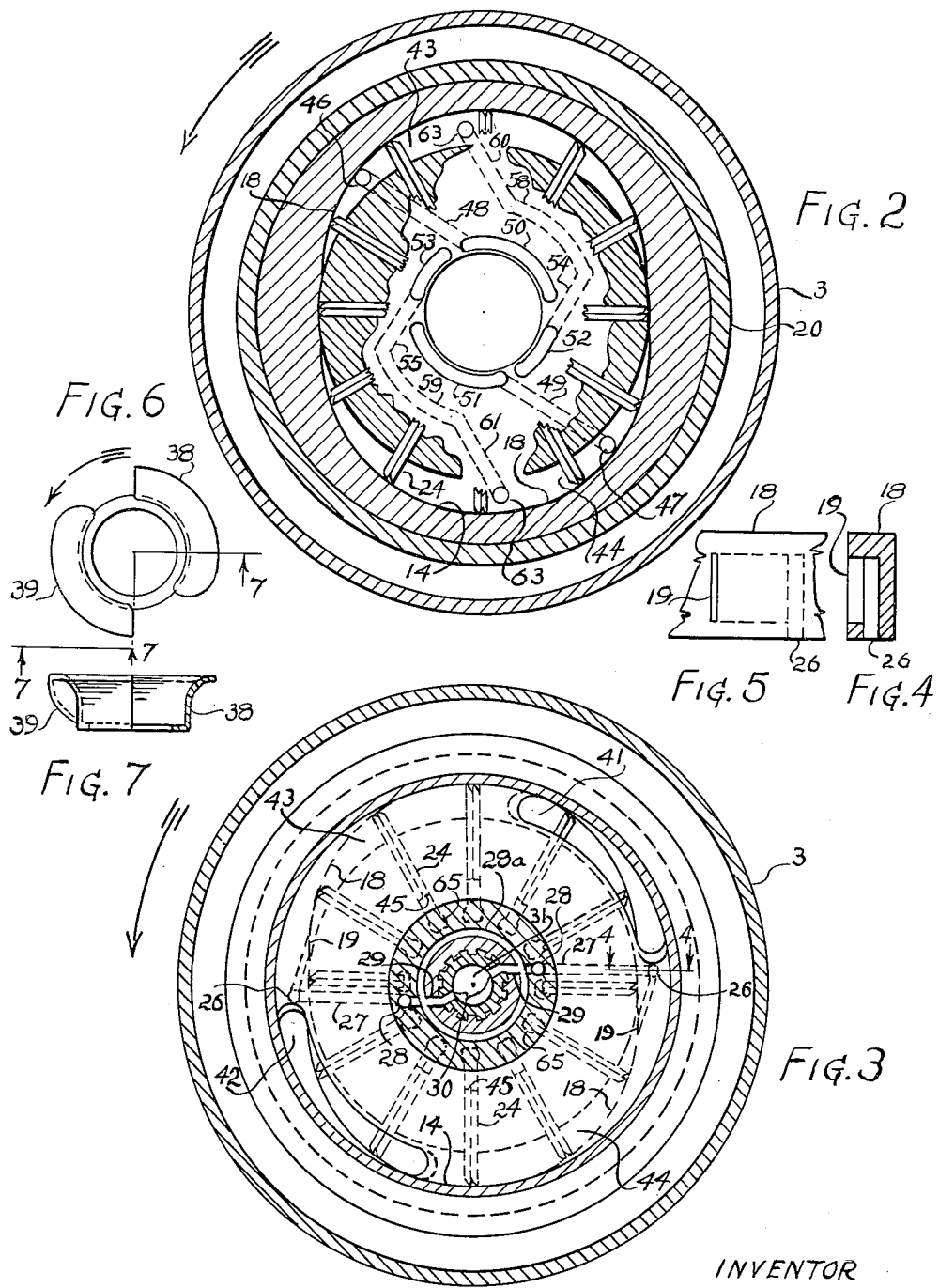
INVENTOR
Ambrose E. Zierick

United States Patent Office 3,058,557
Patented Oct. 16, 1962

3,058,557
HYDRAULIC CLUTCH AND TURBINE DRIVE
Ambrose E. Zierick, 212 E. 182nd St., Bronx 57, N.Y.
Filed Jan. 27, 1959, Ser. No. 789,434
10 Claims. (Cl. 192—58)

My invention relates to certain new and useful improvements in hydraulic clutch and controlled planetary differential transmission of the hydraulic variable speed type.

One of the objects of my invention is to provide a variable output speed of the driven element by finger-tip adjusting, also in which the torque increases as the speed decreases.

The above and other objects and advantages of my invention will be more readily apparent from the following description and accompanying drawings, in which:

FIG. 2 is a cross-section of FIG 1 taken on line 2—2.

FIG. 3 is a cross-section of FIG. 1 taken on line 3—3.

FIG. 4 is a section of ring cam taken on line 4—4 of FIG. 3.

FIG. 5 is a fractional face view of ring cam FIG. 4.

FIG. 6 is a face view of scoop impeller taken on line 6—6 FIG. 1.

FIG. 7 is a partly sectional view of FIG. 6 taken on line 7—7—7.

Figure 1:
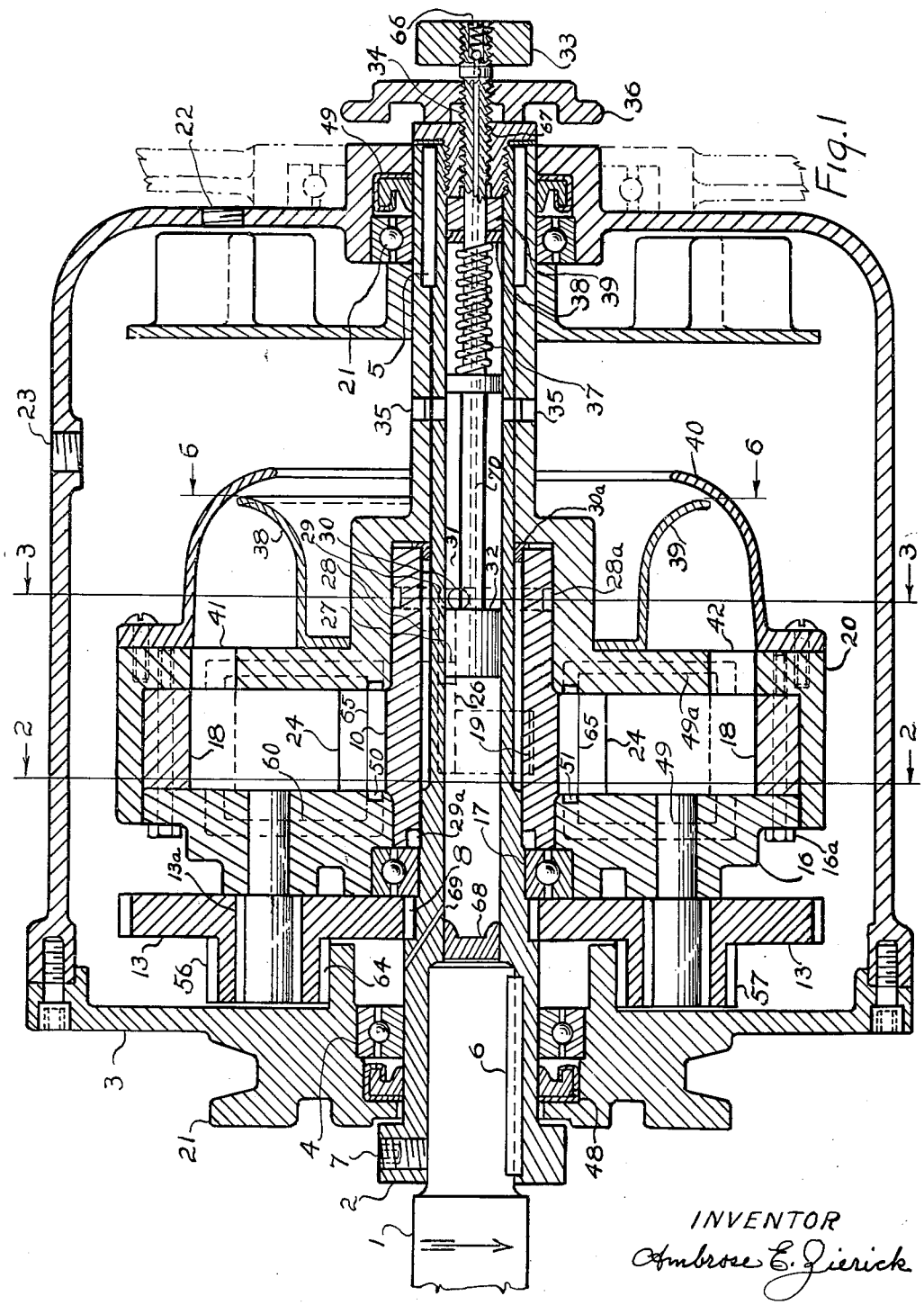
FIG. 1 is a transverse section of my invention showing an enclosed hydraulic vessel having an input and output power transmitting means.

Referring now to FIG. 1, wherein like numbers designate like parts throughout and with figure numeral designations synonymous with sectional numerals, in which drive shaft 1 in this particular set up is a standard pulley drive shaft found on any conventional electric motor. Motor drive shaft 1 supports spindle 2 upon which hydraulic vessel 3 is rotatably mounted on ball bearing 4 and confined rotatably on needle bearing 5 through bearing 21. Spindle 2 is keyed to shaft 1 at 6 and secured by set screw 7, and is driven in fixed relation to motor shaft 1 for transmitting an input source of power at constant motor speed.

Spindle 2 has an integral pinion or sun gear 8 in constant mesh with planet gears 13 which are mounted on needle bearings 13a and are rotatably carried by a planet carrier 16. Planet carrier is bolted at 16a to flange spindle 20 rotatably mounted with respect to spindle 2 on ball bearings 17 and the aforementioned bearing 21. Integrally bolted with planet carrier 16 and flange spindle 20 is a cam ring 18 which concentrically confines a rotatable impeller or rotor 10 fixed to spindle 2 and having a series of sliding vanes 24 that slide in and out on inner contour 14 of cam 18, FIGS. 2 and 3. The rotor action in operation with hydraulic vessel 3 nearly filled with hydraulic fluid through plug holes 22 and 23, FIG. 1 induces a pump action against cam ring 18. This rotor pump action is similar to and more particularly described in my application for patent Serial No. 752,054, filed July 30, 1958 now Patent No. 2,932,991, and in both instances the rotor revolves counterclockwise when viewed from the outer end of FIG. 1 on the right.

The sun gear 8 rotating counterclockwise similarly to the rotor 10 coacts with the latter for inducing planet carrier 16 to rotate likewise counterclockwise,. The cam 18 having two diametrical opposite compression chambers with discharge orifices 19, FIGS. 3, 4 and 5, rotates with rotor 10 and is allowed to slip or lag a given amount corresponding to amount of compression fluid allowed to escape through orifices 19 via ducts 26, 27, 28, 29, and emerges at ports 30 into a cylindrical chamber 31, FIG. 1. Piston 32 is integral with a control knob 33 and turning the latter on its threaded stem portion 34 causes piston to close or open ports 30 in whatever proportion hydraulic fluid is regulated for escape from rotor compressor. The escaped hydraulic fluid emerging from ports 30 is discharged through ports 35 back into the hydraulic vessel 3. Lock knob 36 serves for locking securely whatever speed setting is made by knob 33. Spring 37 depresses disc 38 against packing seal 39 for preventing fluid by passing into the atmosphere.

Outlet valve 66 is preset at a required pressure of 5 lbs. and does not release any ambient air unless the internal pressure exceeds the pressure the valve has been set at.

The above type of control is similar to that partly shown in my patent application Ser. No. 238,699, filed July 26, 1951, now abandoned.

Scoops impeller 38 and 39, FIG. 1 and FIG. 7, rotates around annulus 40 and tends to force fluid into port openings 41 and 42 for charging compression chambers 43 and 44 whenever pumping action demands it.

Pressure of the sliding vanes 24 in contact with cam ring 18 is partly stressed by centrifugal force and an additional stress is due from hydraulic pressure admitted to shuttle slots 65 and applied on the inner ends 45 of vanes 24, FIG. 3 superimposed on FIG. 2 which pressure is derived from compression chambers 43 and 44 through ports 46 and 47 via diagonal ducts 48 and 49 and open annular slots 50 and 51 extending arcuately sufficiently for the duration of the passing vanes in their compression cycle.

The vanes when rotating on a rising cam are on a retraction stroke, forcing all fluid to discharge from shuttle slots 65 into annular slots 52 and 53, through diagonal ducts 54 and 55, annular discharge ducts 58 and 59, and thence diagonal discharge ducts 60 and 61 to emerge at discharge ports 62 and 63 respectively leading into an advance stage of low pressure area of compression chambers 43 and 44.

My patent application, as aforementioned, Serial No. 752,054, now Patent No. 2,932,991, describes the above hydraulic function of stressing centrifugally the inner ends of vanes except that it is shown applied on one side of rotor only and in the present instance this function is shown on both sides of rotor vanes by ducts 49 and 49a, FIG. 1, the latter being the opposite hand to the one shown in FIG. 2 which in the present illustration as drawn is for simplicity of clarification.

In operation motor drive shaft 1, sun gear 8, and vane rotor 10, are integrally driven as aforementioned in a counterclockwise direction as viewed from end of control knobs at right, and the speed of the output V pulley 21 may be regulated from high to low through the planetary differential obtained in planet carrier 16 and planet gears 13, the former being integral with ring cam 18. When the compression medium is trapped and pump action is nil due to ports 30 being closed there is no differential functioning and output speed at V pulley 21 is common with input speed of motor drive shaft which is maximum or high speed.

Whenever it is desired to change the output speed slightly from high to a lower speed, a release of fluid from compression chamber 43 and 44 is leaked out at 35 by turning slightly control knob 33, thus starting a pumping action, thereby slipping cam ring 18 to slow down from turning with vane rotor 10 which is in a counterclockwise rotation and planet carrier 16 being integral with cam ring follows in similar slowing down rotation by being integrally common. Planet gears 13 now induced to turn by planet rotation in common with ring cam, follow in mesh with sun gear 8 which is turning counterclockwise, causing a differential speed to start functioning with planet pinions 56 and 57 engaged with ring gear 64, the latter also being forced to turn counterclockwise. Any further increase of differential speed requires a greater increase of pump action whereby the output speed is decreased proportionately while the torque increases.

The speed of the motor drive shaft is constant, and in common with vane rotor 10 and sun gear 8 and whenever output speed is reduced the torque applied by the action of the vane rotor pump against cam ring begins a flexible decrease of the latter, while the sun gear meshed with planet gears is fixedly in gear and rotating them invariably, inducing a dynamic fulcrum action between meshed sun gear and the invariably pressure slipped cam ring.

The subsequent compound gear ratio induces an increase of output torque which in the present illustration would be 2½ to 3 times the input torque depending upon hydraulic increase of the vane rotor pump action or hydraulic slippage.

Any abnormal ambient temperature rise is held in check by the heat transfer of induction to the outer periphery and any abnormal internal pressure is allowed to escape through vent 66 which device has been described in the aforementioned and in my previous patent application. It is obvious that oil retainers 48 and 49 FIG. 1 are effectively assembled in accordance with general practice and that the threaded throat portion 67 of spindle 2 FIG. 1 is made adaptable for a jack-off bolt to be used for extracting spindle off motor drive shaft 1. In the process of extracting spindle off motor drive shaft 1. In the process of extraction, oil retainer plug 68 is rendered useless and therefore is to be replaced, which is an expendable item. Air vent 69 allows further escape of internal pressures and links up with air duct 70. Likewise oil retainers 29a and 30a keep the oil confined between their respective component surfaces.

While one embodiment of the invention has been shown and described in detail herein, it will be understood that this is illustrative only and is not to be taken as a limited scope of my invention, reference being had for this purpose to the appended claims.

I claim:

1. In a hydraulic clutch the combination comprising a driven circular enclosed outer vessel with power take-off, containing hydraulic fluid, a driven hollow spindle journaled coaxially therein with one end having a recess for mounting on a motor shaft, the other end of said spindle having fitted therein a slidable plunger, said spindle having opposed ports for said plunger to slide over for opening and closing said ports at the same time, an inner enclosed driven cylindrical member journaled on said spindle, a rotor member fixed to said spindle within said inner cylindrical member and having a plurality of radial, axially extending slots, a vane radially slidable in each of said slots, diametrically opposite ducts in said rotor in register with one set of ports in said hollow spindle, said ducts being connected with a posterior groove on a hub portion of said rotor opposite parallel side walls integral with said cylindrical member and adjacent to side portions of said vanes between which said vanes are radially slidable, a cam ring in said inner cylindrical member encompassing the outer ends of said vanes to limit their radial movements, the interior periphery of said cam ring walls having opposed arcuate end wall areas, said end wall areas having discharge ports with duct means connecting with egress means in said inner enclosed driven cylindrical member, said end wall areas together with said rotor and said side walls defining hydraulic pressure chambers with respect to said vanes while rotating, one of said side walls having ports for admitting fluid from said outer driven vessel to said inner pressure chamber, said driving rotor imparting a normal rotary speed to said inner cylindrical member by hydraulic action, and means for adjustably releasing pressure in said hydraulic pressure chambers, through said cam discharge ports, through said ducts in said inner enclosed cylinder, said annulus and said ducts in said rotor hub, said diametrical opposite ports in said hollow spindle, through said outer spindle to release ports into the outer vessel, said plunger regulating the opening and closing of said first-mentioned spindle ports, said plunger having external means for manual control.

2. A hydraulic clutch as defined in claim 1 including impeller means fixed to said rotor member for forcing hydraulic fluid through said hydraulic fluid admitting ports and into said pressure chambers.

3. A hydraulic clutch as defined in claim 1 wherein said impeller means comprises an impeller member having a plurality of arcuate scoops fixed with respect to said rotor member, and an annulus fixed with respect to said driven member and coaxial therewith and having an annular guide surface portion in closely spaced disposition with respect to peripheral end portions of said scoops.

4. A hydraulic clutch as defined in claim 1 wherein said drive member is in the form of a hollow spindle, and wherein said pressure releasing means comprises fluid flow passageways between said pressure chambers and the interior of said hollow spindle, and two sets of diametrically opposite ports for valve means in said hollow spindle and adjustable exteriorly of said hydraulic vessel at one end of said drive member.

5. A hydraulic clutch as defined in claim 4 including means for locking said plunger in adjusted position with respect to said spindle ports.

6. A hydraulic clutch as defined in claim 5 wherein said valve means comprises a plunger adjustment stem fixed to said plunger and extending through one end of said spindle, and wherein said plunger locking means comprises a threaded end portion of said stem threadedly engaged in an interiorly threaded end member secured to said one end of said spindle, and a lock knob threaded on the exteriorly projecting end of said threaded end portion of said stem and screwable into abutting relation against the outer end of said end member.

7. A hydraulic clutch as defined in claim 6, wherein the other end of said spindle is in communication with the interior of said hydraulic vessel above the level of hydraulic fluid therein and including air pressure relief means including a passageway extending through said plunger and said plunger stem into the outer atmosphere.

8. A hydraulic clutch as defined in claim 7 including a cylindrical knob fixed to the outer end of said plunger stem for facilitating manual adjustment thereof in controlling said valve means, and wherein said air pressure relief means comprises a spring-pressed ball seated in a port at the outer end of said relief means passageway.

9. A hydraulic clutch as defined in claim 8 including impeller means fixed to said rotor member for forcing hydraulic fluid through said hydraulic fluid admitting ports and into said pressure chambers.

10. A hydraulic clutch as defined in claim 9 wherein said impeller means comprises an impeller member having a plurality of arcuate scoops fixed with respect to said rotor member, and an annulus fixed with respect to said driven member and coaxial therewith and having an annular guide surface portion in closely spaced disposition with respect to peripheral end portions of said scoops.

References Cited in the file of this patent

UNITED STATES PATENTS

| | | |
|---|---|---|
| 1,667,290 | Gayer | Apr. 24, 1928 |
| 1,905,041 | Monroe | Apr. 25, 1933 |
| 2,026,777 | Dumble | Nov. 10, 1934 |
| 2,244,929 | Wall | June 10, 1941 |
| 2,611,247 | Brown | Sept. 23, 1952 |
| 2,660,279 | Knight | Nov. 24, 1953 |
| 2,932,991 | Zierick | Apr. 19, 1960 |